Aug. 5, 1924.
G. W. WILSON
AGRICULTURAL DEVICE
Filed May 13, 1922
1,503,970
2 Sheets-Sheet 2
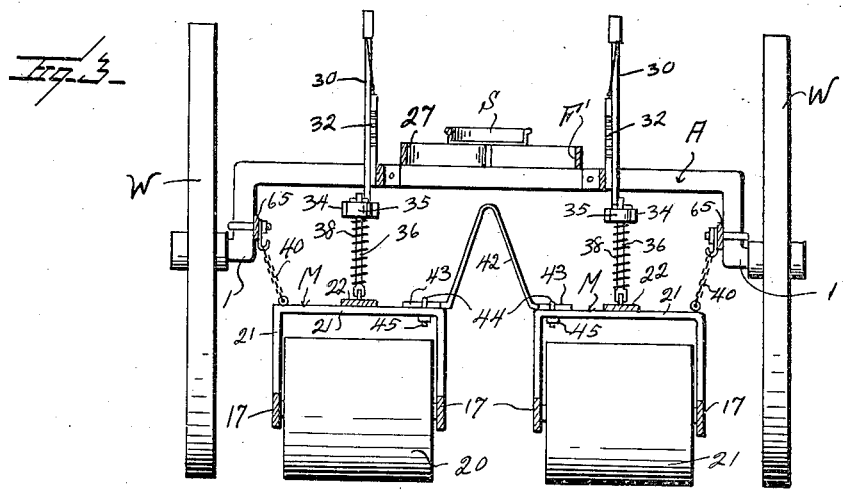
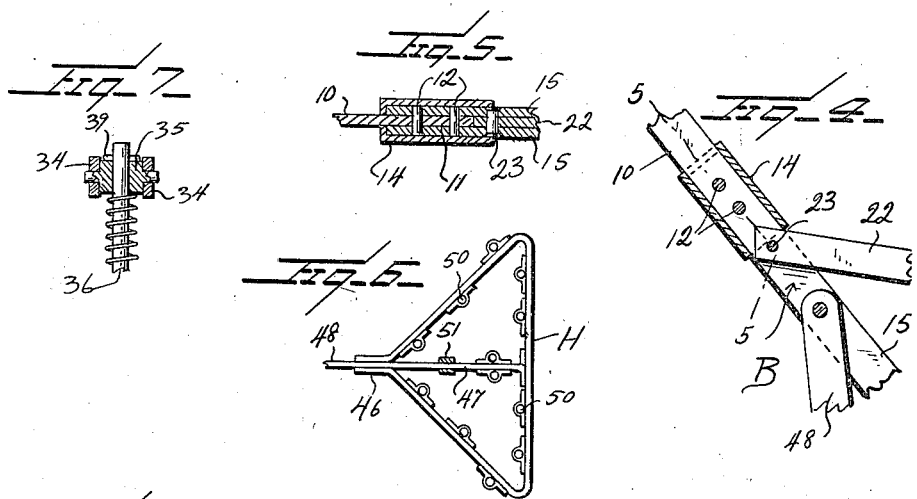
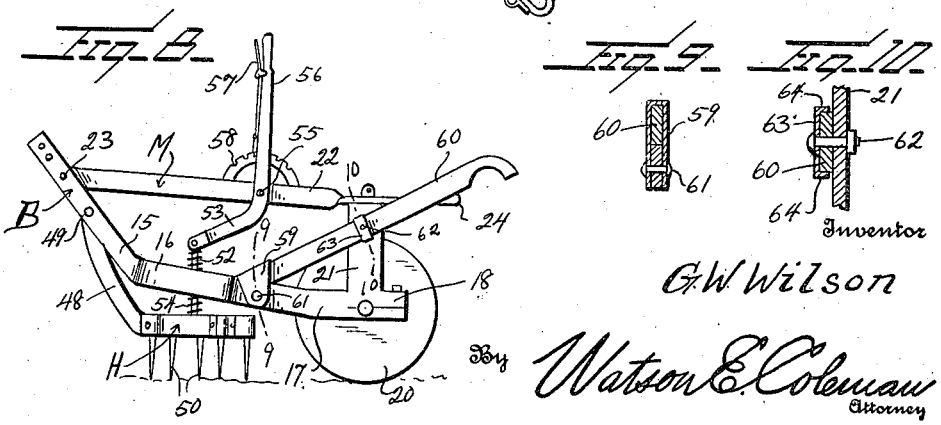
Inventor
G. W. Wilson
By Watson E. Coleman
Attorney Patented Aug. 5, 1924.

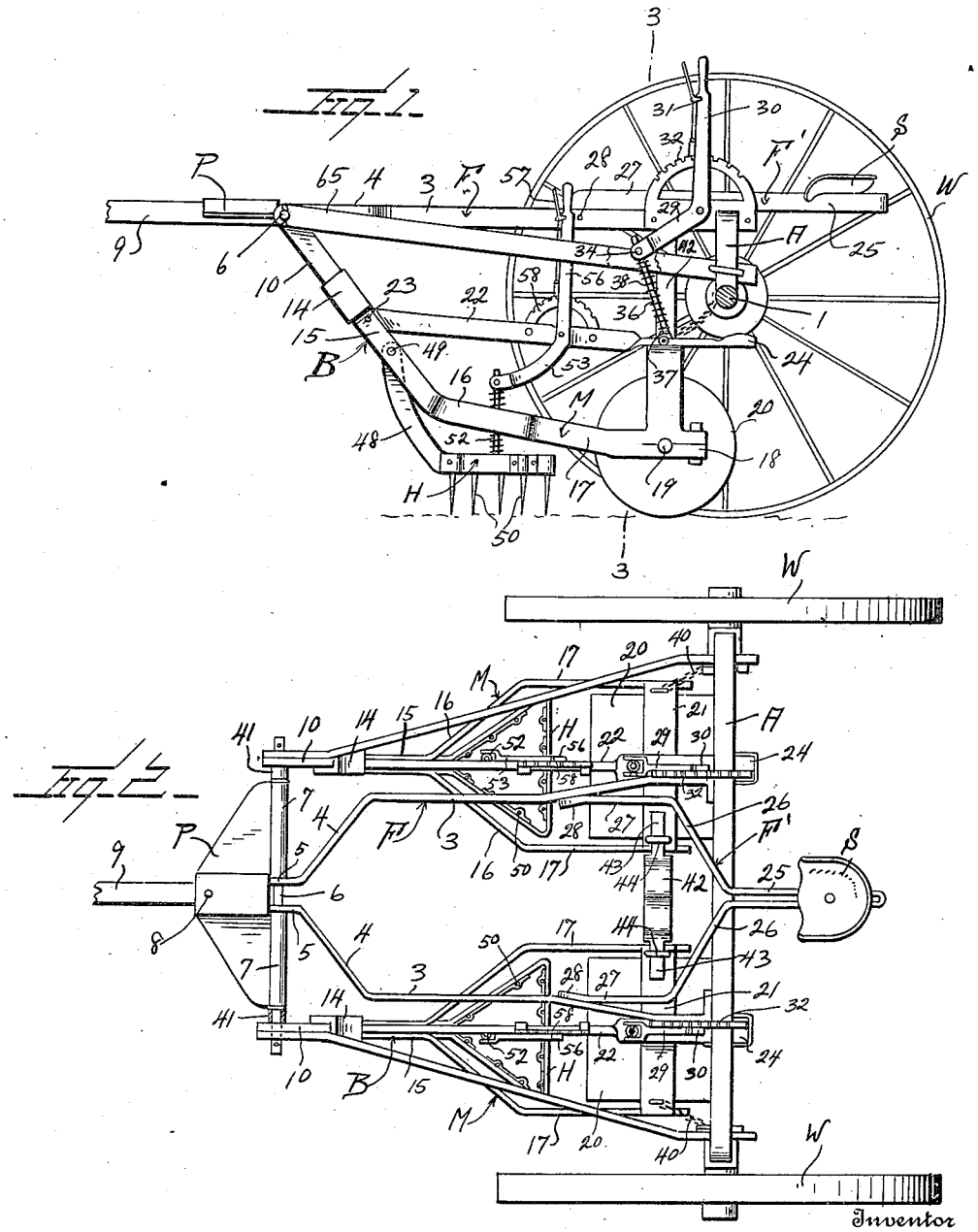

1,503,970

UNITED STATES PATENT OFFICE.

GEORGE W. WILSON, OF HOPKINSVILLE, KENTUCKY.

AGRICULTURAL DEVICE.

Application filed May 13, 1922. Serial No. 560,583.

*To all whom it may concern:*

Be it known that GEORGE W. WILSON, a citizen of the United States, residing at Hopkinsville, in the county of Christian and State of Kentucky, has invented certain new and useful Improvements in Agricultural Devices, of which the following is a specification, reference being had to the accompanying drawings.

This invention relates to certain improvements in agricultural devices and it is an object of the invention to provide a device of this general character having novel and improved means to both harrow and roll the soil.

Another object of the invention is to provide a novel and improved device of this general character including a plurality of ground working members which may be employed either in gang or singly and each of which ground working members include both a harrow and a land roller.

An additional object of the invention is to provide a novel and improved device of this general character including a harrow and a land roller arranged in a manner whereby both of said elements may be raised or lowered in unison or the harrow raised and lowered independently of the land roller.

Furthermore, it is an object of the invention to provide a novel and improved device of this general character comprising a structure embodying a plurality of ground working mechanisms and wherein each of said mechanisms may be readily detached or removed and assembled in a manner to permit its independent use.

The invention consists in the details of construction and in the combination and arrangement of the several parts of my improved agricultural device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of an agricultural device constructed in accordance with an embodiment of my invention;

Figure 2 is a view in top plan of the device as illustrated in Figure 1;

Figure 3 is a sectional view taken substantially on the line 3—3 of Figure 1;

Figure 4 is an enlarged fragmentary view partly in section and partly in elevation illustrating in detail the means for holding one of the ground working members in applied position;

Figure 5 is a sectional view taken substantially on the line 5—5 of Figure 4;

Figure 6 is a view in top plan of a harrow detached;

Figure 7 is a fragmentary view partly in section and partly in elevation illustrating a connection of a lifting lever with its rod and the spring associated therewith;

Figure 8 is an elevational view of one of the ground working members removed;

Figure 9 is a sectional view taken substantially on the line 9—9 of Figure 8; and Figure 10 is a sectional view taken substantially on the line 10—10 of Figure 8.

As disclosed in the accompanying drawings, A denotes an arched axle provided with spindles 1 on each of which is mounted a supporting wheel W. Secured upon its rear portion to the axle A is a forwardly extending frame F comprising the spaced side members 3, the forward end portions of which being provided with the converging extensions 4 terminating in the forwardly directed parallel arms 5. Disposed through the arms 5 is a rod 6 extending a material distance beyond each of the arms 5.

P denotes a plate provided at its rear portion with the barrels 7 through which the rod 6 is disposed and operatively connected with said plate P as at 8 and at the central portion thereof is the forwardly disposed draft pole 9.

Pivotally engaged with each outer end portion of the rod 6 is an arm 10 which is adapted to extend within a kerf 11 provided in the upwardly directed beam B of a ground working member denoted in its entirety as M. The beam B is coupled to the arm 10 by the removable pins 12 and said pins are held against displacement by the sliding cuff or sleeve 14. When it is desired to remove a member M for separate use the sleeve or cuff 14 is moved upwardly of the arm 10 and free of the beam B whereupon the pins 12 can be readily removed. When the member M is separately used it is adapted to be drawn by a single draft animal suitably hitched to the upper portion of said beam B.

The beam B comprises two spaced parallel arms 15 terminating in the rearwardly diverging arms 16. The arms 16 are continued by the rearwardly directed arms 17 preferably in parallelism and which are provided at their rear extremities with the bearings 18 for the shaft 19 of the land roller 20. The rear portions of the arms 17 support an upstanding arched member or yoke 21 which straddles the roller 20 from above. Connected with the center portion of the member 21 is a beam or strap 22 which extends forwardly and is secured as at 23 between the arms 15. This beam or strap 22 assures a rigid and effective supporting frame for the roller 20.

The rear portion of the beam or strap 22 extends rearwardly of the arch member or yoke 21 to provide a foot rest 24 for the occupant of the seat S. The seat S is arranged upon a supplemental frame structure F′ comprising at its rear portion the parallel arms 25 which at a point directly above the axle A are continued by the diverging arms 26 continued by the forwardly directed arms 27 which are suitably secured to the side members 3 of the frame F at a point in advance of the axle A. The connections 28 between the arms 27 and the side members 3 are pivotal so that the supplemental frame F′ may be readily swung upwardly as may be desired and also to assure said frame F′ having direct contact with the axle A so that said frame F′ is effectively supported and especially when the seat S is occupied. Pivotally engaged with the rear portion of each of the side members 3 of the frame F is a forwardly and downwardly inclined rock arm 29 continued at its pivoted end portion by the upstanding hand lever 30. The lever 30 is provided with the conventional latch mechanism 31 which co-acts with the upstanding arcuate rack 32 carried by the adjacent portion of the side member 3.

The free or outer extremity of the rock arm 29 is provided with a yoke or clevis between the side arms 34 of which is supported for rocking movement an annular member or ring 35 (Fig. 7). Slidably disposed through the annular member or ring 35 is a rod 36 which is pivotally connected at its lower end as at 37 with the central portion of the arched member or yoke 21 and more particularly to that portion of the beam or strap 22 overlying the member or yoke 21. Interposed between the beam or strap 22 and the annular member or ring 35 is an expansible member 38 herein disclosed as a coil spring encircling the rod 36 and which operates to urge the member M downwardly.

The portion of the rod 36 above the annular member or ring 35 has disposed therethrough a cotter pin 39 or the like so that upon rearward movement of the lever 30 the member M will be raised as desired and held in such raised position by the co-action of the latch mechanism 31 with the rack 32. It is particularly desirable to raise or elevate the member M when the device is being transported.

Connecting each of the members or yokes 21 and the adjacent portions of the axle A are the flexible members 40 herein disclosed as a chain, which members 40 operate to hold the members M against undue side movement which would otherwise have a tendency to interfere with the effective use of the device.

The members M may be transversely adjusted one with respect to the other and maintained in such adjustment through the instrumentality of the spacing sleeves 41 mounted upon the rod 6 and interposed between the outer ends of the barrel 7 and the arms 10. This relative arrangement is also maintained through the instrumentality of the spreader 42 herein disclosed in the form of an inverted V and the side arms of which are capable of relative movement. The extremities of the member 42 are continued by the outstanding feet 43 which extend through a U clamp 44 carried by the opposite or adjacent end portions of the members or yokes 21, said clamps 44 through the medium of the nuts 45, serving to effectively maintain the spreader 42 in applied position.

H denotes a harrow frame triangular in plan which is preferably formed of a single strap of iron with the extremities of said strap comprised in the apex portion of the frame and continued by the outstanding arms 46. Extending between the arms 46 and secured thereto is a brace member 47 also secured to the center portion of the rear of the frame H. The forward portion of the member 47 is continued by an upwardly disposed beam or standard 48. The upper or free end portion of this beam or standard 48 extends between the arms 15 of the beam B and is pivotally connected thereto as at 49 whereby the harrow frame H is capable of swinging movement in a vertical direction. Carried by the frame H and depending therefrom are the teeth 50 of the ordinary or any preferred type.

Pivotally connected as at 51 with the central portion of the brace member 47 is the lower end portion of an upstanding rod 52. The upper end portion of this rod 52 is operatively engaged with a downwardly and forwardly inclined rock arm 53 in substantially the same manner as hereinbefore referred to in connection with the rock arm 29 and the rod 36. Encircling the rod 52 is an expansible spring 54 which serves to constantly urge the harrow frame H downwardly to permit the same to have yielding contact with the surface being treated.

The rock arm 53 is pivotally engaged as at 55 with the beam or strap 22 and the pivoted extremity of this arm 53 is continued by an upstanding operating lever 56. The lever 56 is provided with a conventional latch mechanism 57 which co-acts with the arcuate rack 58 carried by the beam or strap 22. By proper operation of the lever 56 the harrow frame H may be raised or lowered independently of the arms 15 and particularly to control the extent of penetration of the teeth 50 into the soil.

When a member M is detached for separable or independent use a bracket 59 is secured to each of the arms 17 at a point in relatively close proximity to the adjacent arms 16. The bracket 59 is in the form of an inverted U and extends above the arm 17 to receive the lower end portion of a handle member 60. The bracket 59 is held in applied position by a bolt 61 or the like.

The handle member 60 extends upwardly and rearwardly on a predetermined incline and extends across a side member of the yoke 21 and is secured to said side member of the yoke 21 by a bolt 62 or the like, said bolt also extending through a protecting plate 63 overlying the outer face of the handle member 60 and extending transversely thereof. The extremities of the plate 63 terminate in the inwardly directed flanges 64 which overlap the longitudinal edges of the handle member 60 whereby the plate 63 serves effectively to prevent splitting of the handle member 60.

To further brace the structure, as particularly illustrated in Figures 1, 2 and 3, I interpose between each outer end portion of the rods 6 and a side member of the arched axle A a brace strap or beam 65.

From the foregoing description it is thought to be obvious that an agricultural device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising an upwardly directed beam comprising members arranged side by side, the lower portion of said members being separated, an upstanding arched member connecting the rear extremities of the separated portions of the beam, a roller supported between said separated portions of the beam, a member connecting the arched member and the upper portion of the beam, a harrow supported by the beam for swinging movement in a vertical direction, and means carried by the member and operatively engaged with the harrow for raising and lowering the same.

2. A device of the class described comprising a portable wheeled frame, a depending arm pivoted to the forward portion of the frame for vertical swinging movement, a beam, means for detachably connecting the beam with the arm, said beam having rear portions separated and connected by an arched member, a land roller rotatably supported between the separated portions of the beams, a harrow positioned in advance of the roller, a beam associated with the harrow and pivotally engaged with the first named beam for swinging movement in a vertical direction, means carried by a portable frame and operatively engaged with the arched member for simultaneously raising and lowering the land roller and harrow, means for raising and lowering the harrow independently of the land roller, means for constantly urging downwardly the land roller, and means for holding the land roller against undue movement transversely of the direction of travel of the device.

In testimony whereof I hereunto affix my signature.

GEORGE W. WILSON.